(12) United States Patent
Agbabian et al.

(10) Patent No.: US 10,986,117 B1
(45) Date of Patent: Apr. 20, 2021

(54) SYSTEMS AND METHODS FOR PROVIDING AN INTEGRATED CYBER THREAT DEFENSE EXCHANGE PLATFORM

(71) Applicant: CA, INC., San Jose, CA (US)

(72) Inventors: Paul Agbabian, Los Angeles, CA (US); Roumen Roupski, Tehachapi, CA (US); Lois Mulcahy, Venice, CA (US)

(73) Assignee: CA, Inc., San Jose, CA (US)

(*) Notice: Subject to any disclaimer, the term of this patent is extended or adjusted under 35 U.S.C. 154(b) by 125 days.

(21) Appl. No.: 16/147,051

(22) Filed: Sep. 28, 2018

Related U.S. Application Data

(60) Provisional application No. 62/715,655, filed on Aug. 7, 2018.

(51) Int. Cl.
| | |
|---|---|
| *H04L 29/06* | (2006.01) |
| *G06F 21/55* | (2013.01) |
| *G06F 21/62* | (2013.01) |

(52) U.S. Cl.
CPC .......... *H04L 63/1441* (2013.01); *G06F 21/55* (2013.01); *G06F 21/6218* (2013.01); *H04L 63/20* (2013.01)

(58) Field of Classification Search
CPC ..... H04L 63/1441; H04L 63/20; G06F 21/55; G06F 21/6218
See application file for complete search history.

(56) References Cited

U.S. PATENT DOCUMENTS

| | | | | |
|---|---|---|---|---|
| 7,472,422 | B1* | 12/2008 | Agbabian | H04L 41/06 726/25 |
| 7,712,137 | B2* | 5/2010 | Meier | H04L 63/1433 726/25 |
| 8,856,936 | B2* | 10/2014 | Datta Ray | H04L 63/20 726/25 |
| 9,245,147 | B1* | 1/2016 | Williams | G06F 21/55 |
| 2005/0015624 | A1* | 1/2005 | Ginter | G06F 21/55 726/4 |
| 2007/0113080 | A1* | 5/2007 | Shankar | H04W 12/12 713/166 |
| 2008/0229427 | A1* | 9/2008 | Ramirez | H04L 67/02 726/26 |
| 2009/0217383 | A1* | 8/2009 | Walter | H04L 63/20 726/26 |
| 2012/0246727 | A1* | 9/2012 | Elovici | H04L 43/00 726/23 |
| 2013/0104236 | A1* | 4/2013 | Ray | H04L 63/1408 726/25 |

(Continued)

*Primary Examiner* — Cheng-Feng Huang
(74) *Attorney, Agent, or Firm* — FisherBroyles, LLP

(57) ABSTRACT

The disclosed computer-implemented method for providing an integrated cyber threat defense exchange platform may include (i) receiving unnormalized security data from a plurality of disparate security data sources that generate security data in differing formats, (ii) normalizing, using a security data schema, the unnormalized security data into normalized security data, (iii) identifying a security action that is responsive to at least one security event identified within the normalized security data, and (iv) coordinating performance of the security action within a plurality of networked computing devices. Various other methods, systems, and computer-readable media are also disclosed.

20 Claims, 7 Drawing Sheets

(56) References Cited

U.S. PATENT DOCUMENTS

| | | | |
|---|---|---|---|
| 2014/0143873 A1* | 5/2014 | Stirtzinger | H04L 63/1408 726/23 |
| 2014/0380488 A1* | 12/2014 | Datta Ray | H04L 63/1433 726/25 |
| 2015/0074810 A1* | 3/2015 | Saher | G06F 16/951 726/23 |
| 2015/0242619 A1* | 8/2015 | Bender | G06F 21/577 726/22 |
| 2017/0223046 A1* | 8/2017 | Singh | H04L 63/1491 |
| 2020/0028861 A1* | 1/2020 | Pritzkau | H04L 63/1416 |

\* cited by examiner

SYSTEMS AND METHODS FOR PROVIDING AN INTEGRATED CYBER THREAT DEFENSE EXCHANGE PLATFORM

CROSS REFERENCE TO RELATED APPLICATION

This application claims the benefit of U.S. Provisional Application No. 62/715,655, filed Aug. 7, 2018, the disclosure of which is incorporated, in its entirety, by this reference.

BACKGROUND

The internet has enabled easy access to transformative digitized information on a global scale, in turn improving lifestyles and providing businesses with manifold opportunities for growth and optimization. Over time the internet has fostered, and been used to interconnect, a wide variety of different networked computing devices in many different digital environments. Each of these different networked computing devices and digital environments may provide their own sets of benefits and may facilitate access to internet-connected resources under many different circumstances.

The utility of providing access to a wide variety of different networked computing devices in different digital environments is clear. Unfortunately, networked computing devices and environments also offer an ever-growing target for malicious actors. Today's cyberattacks range from petty phishing attempts to denial of service attacks to advanced persistent threats. Commonly, disparate software security products functioning as sources of disparate security data have been tailored to the unique threats faced by the specific networked computing devices and digital environments they are designed to protect. While this approach has been useful for protecting those networked computing devices, these disparate security data sources may produce security data in a similarly disparate range of formats, making a coordinated strategy immensely complicated and/or impractical.

SUMMARY

As will be described in greater detail below, the instant disclosure describes various systems and methods for providing an integrated cyber threat defense exchange platform. In some examples, a corresponding computer-implemented method may include (i) receiving unnormalized security data from a plurality of disparate security data sources that generate security data in differing formats, (ii) normalizing, using a security data schema, the unnormalized security data into normalized security data, (iii) identifying a security action that is responsive to at least one security event identified within the normalized security data, and (iv) coordinating performance of the security action within a plurality of networked computing devices. The security data may include or represent, for example, security event data, security action data, and/or security intelligence data.

In some embodiments, the method may further include parsing the security data received from the plurality of disparate security data sources. The method may also include filtering the normalized security data onto a data storage device. In addition, the method may include archiving the normalized security data onto a data storage device.

In one example, receiving the security data may include receiving the security data from at least one networked computing device that (i) detects, using the networked computing device, the security event, (ii) records, using the networked computing device, the security data based at least in part on detection of the security event, and (iii) transmits, using the networked computing device, the security data to the integrated cyber threat defense exchange platform. In this example, the security event may be triggered at least in part by a cyberattack.

Examples of data that may be relevant to a security system may include a software application behavior report, a report of user activity at a management console, a report of a user-specified configuration change at the management console, a device activity report, a network activity report, a result from a diagnostic routine, an evidence of compromise (EoC) event report including an EoC query, and an Information Protection category report, a license activity report, and/or an EoC event report including a remediation record.

In some examples, the security data schema may include a superset of security data attributes from a plurality of different security data points. In these examples, each attribute from the superset of security data attributes may be listed in an attribute dictionary stored in a data storage device.

In some embodiments, a system for providing an integrated cyber threat defense exchange platform may include at least one physical processor and physical memory that includes computer-executable instructions that, when executed by the physical processor, cause the physical processor to (i) receive unnormalized security data from a plurality of disparate security data sources that generate security data in differing formats, (ii) normalize, using a security data schema, the unnormalized security data into normalized security data, (iii) identify a security action that is responsive to at least one security event identified within the normalized security data, and (iv) coordinate performance of the security action within a plurality of networked computing devices.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive unnormalized security data from a plurality of disparate security data sources that generate security data in differing formats, (ii) normalize, using a security data schema, the unnormalized security data into normalized security data, (iii) identify a security action that is responsive to at least one security event identified within the normalized security data, and (iv) coordinate performance of the security action within a plurality of networked computing devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
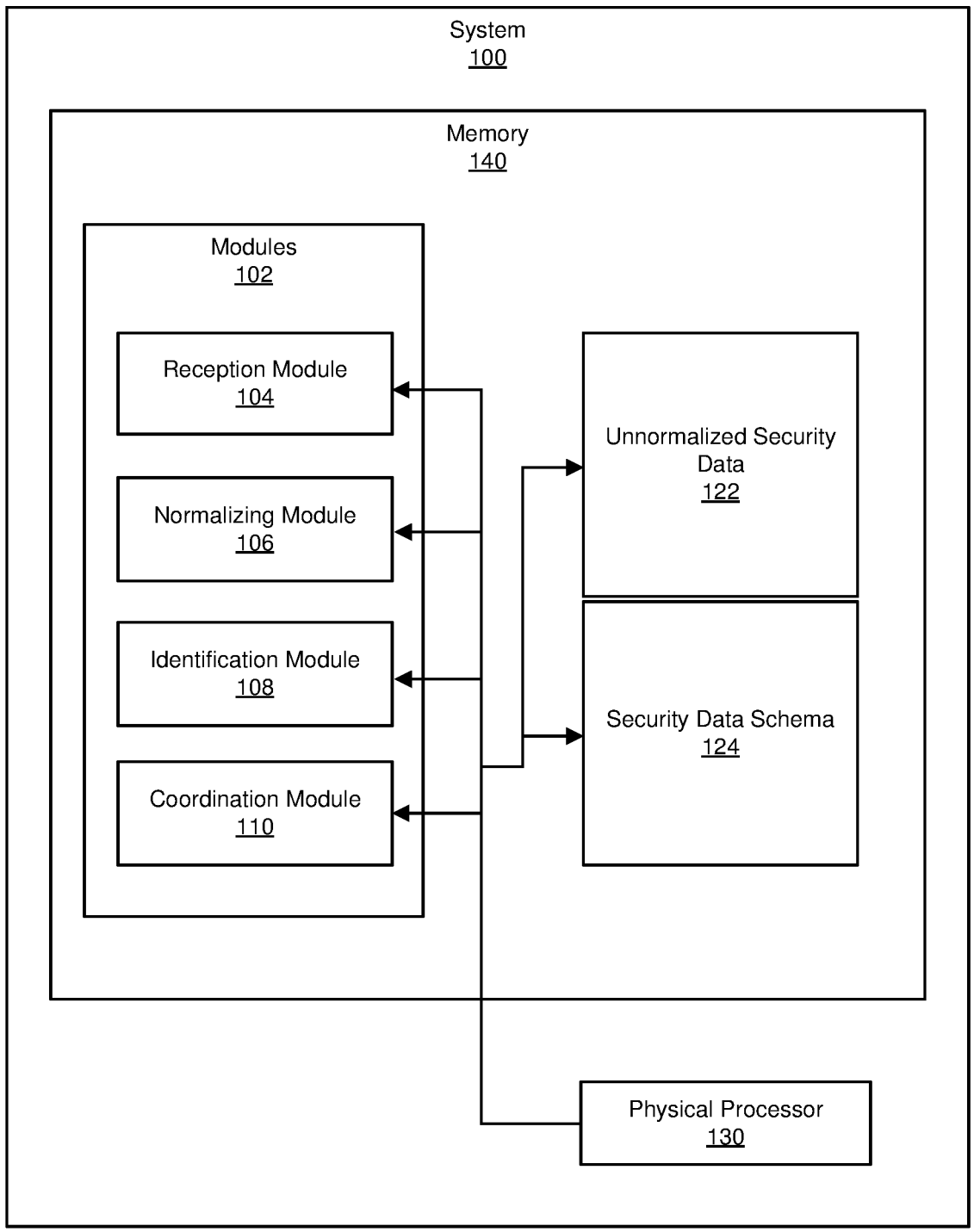
FIG. 1 is a block diagram of an example system for providing an integrated cyber threat defense exchange platform.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing an integrated cyber threat defense exchange platform capable of managing and responding to security events generated by disparate sources in a coordinated, efficient manner. As will be explained in greater detail below, by receiving and normalizing previously unnormalized security data from a plurality of disparate security data sources using a security data schema, the integrated cyber threat defense exchange platform disclosed herein may be able to coordinate the performance of security action(s) within a multitude of networked computing devices. This may, in turn, enable the integrated cyber threat defense exchange platform to leverage knowledge of a threat, solution, and related intelligence from one security data source to improve the security of other disparate security data sources, even if those security data sources are offered or maintained by differing security vendors and/or produce security data in differing formats.

In addition, the systems and methods described herein may improve the functioning of a computing device by detecting potentially malicious software with increased accuracy and thus reduce the computing device's likelihood of falling prey to a successful cyberattack. These systems and methods may also improve the field of heuristic-based computer security and/or enterprise-level security by providing a coordinated approach to security across a plurality of disparate security data sources.

Figure 2:
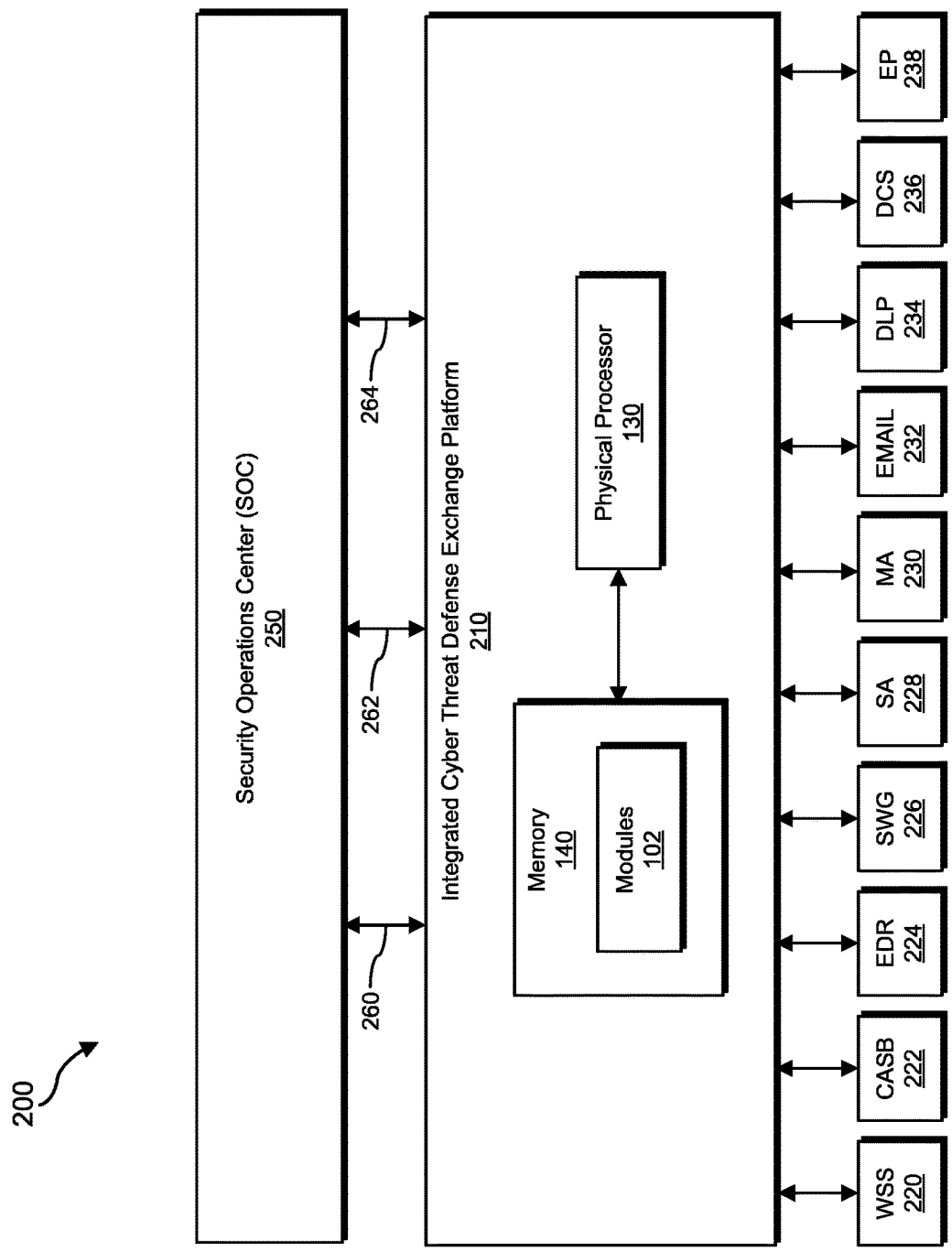
FIG. 2 is a block diagram of an additional example system for providing an integrated cyber threat defense exchange platform.

The following will provide, with reference to FIGS. 1-2, detailed descriptions of example systems for providing an integrated cyber threat defense exchange platform. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for providing an integrated cyber threat defense exchange platform. As illustrated in this figure, example system 100 may include one or more modules 102 for performing one or more tasks. As will be explained in greater detail below, modules 102 may include a receiving module 104, a normalization module 106, an identification module 108, and a coordination module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2, (e.g., integrated cyber threat defense exchange platform 210), and FIGS. 5-7. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing an integrated cyber threat defense exchange platform. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more security data components, such as unnormalized security data 122 and a security data schema 124. As will be described in greater detail below, unnormalized security data 122 may represent security data that has not been normalized, as further discussed and defined below. This security data may represent any type or form of data produced or managed by security data sources, each of which may employ a wide variety of differing formats, fields, or structures.

Example system 100 in FIG. 1 may be implemented in a variety of ways. For example, all or a portion of example system 100 may represent portions of example system 200 in FIG. 2. As shown in FIG. 2, system 200 may include an integrated cyber threat defense exchange platform 210 in communication with a plurality of disparate security data sources, such as a web security service (WSS) device 220 (such as a SYMANTEC WSS-supporting device), a cloud access security broker (CASB) device 222 (such as a SYMANTEC CASB-supporting device), an endpoint detection and response (EDR) device 224 (such as a SYMANTEC EDR device), a security analytics (SA) device 228 (such as a SYMANTEC SA-supporting device), a malware analysis (MA) device 230 (such as a SYMANTEC MA-supporting device), an email device 232, (such as a SYMANTEC Mail Security-supporting device), a data loss prevention (DLP) device 234 (such as a SYMANTEC DLP-supporting device), a data center security (DCS) device 236 (such as a SYMANTEC DCS-supporting device), and an endpoint protection (EP) device 238 (such as a SYMANTEC EP-supporting device), among many other possibilities (including security data sources offered or maintained by other security vendors).

As shown in FIG. 2, integrated cyber threat defense exchange platform 210 may be in communication with a Security Operations Center (SOC) 250, such as one of the SOCs operated by SYMANTEC (or another security vendor) in the United States and other countries. In this example, the SOC 250 may exchange security event data 260, security action data 262, and/or security intelligence data 264 with the plurality of disparate security data sources 220-238 through integrated cyber threat defense exchange platform 210. In some examples, a user or administrator may interface with SOC 250 at least in part using an SOC front-end, such as one or more SOC front-ends provided by ELASTIC, SERVICENOW, SPLUNK, IBM QRADAR, and/or API.

For example, unnormalized security data 122 may be generated by security event(s) occurring on or detected by one or more of the plurality of disparate security data sources 220-238. By way of example, a security event may be the result of a detected potential problem (such as the triggering of a specified security parameter) or the result of periodic scanning. In some examples, the security event may represent a report of anomalous or suspicious activity. Integrated cyber threat defense exchange platform 210 may then receive unnormalized security data 122 as a result of these security events. In some examples, integrated cyber threat defense exchange platform 210 may then use a security data schema to normalize the unnormalized security data into normalized security data by mapping data fields from the unnormalized security data within the security data schema into corresponding data fields in the normalized data. In some examples, security event data 260 may represent normalized security data transmitted from the integrated cyber threat defense exchange platform 210 to the SOC 250. In further examples, integrated cyber threat defense exchange platform 210 may exchange security action data 262 and security intelligence data 264 with SOC 250.

In some examples, the security action data may be identified by integrated cyber threat defense exchange platform 210 and indicate a series of steps to investigate, prevent, mitigate, and/or resolve a problem associated with a known or potential security risk. In other examples, the security action data may be identified by SOC 250 and indicate a series of steps to investigate, prevent, mitigate, and/or resolve a problem associated with a security risk. In these examples, the integrated cyber threat defense exchange platform may then coordinate performance of the security action data within the plurality of networked computing devices.

Integrated cyber threat defense exchange platform 210 generally represents any type or form of computing device (or collection of computing devices) capable of reading computer-executable instructions. In one illustrative example, integrated cyber threat defense exchange platform 210 may correspond to a backend server of a security vendor such as SYMANTEC. In other examples, integrated cyber threat defense exchange platform 210 may correspond to an on-premise security server that has been installed or configured on the premises of a corporate client and customer of a security vendor such as SYMANTEC. Examples of the integrated cyber threat defense exchange platform 210 include, without limitation, security servers, application servers, web servers, storage servers, and/or database servers configured to run certain software applications and/or provide various security, web, storage, and/or database services. Although illustrated as a single entity in FIG. 2, the integrated cyber threat defense exchange platform 210 may include and/or represent a plurality of servers or computing devices that work and/or operate in conjunction with one another. Additional potential components that may be included within, or report to, the integrated cyber threat defense exchange platform 210 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

As illustrated in FIG. 2, networked connections used by the integrated cyber threat defense exchange platform 210 generally represent any medium or architecture capable of facilitating communication or data transfer. In some examples, networked connections used by the integrated cyber threat defense exchange platform 210 may facilitate communication between the integrated cyber threat defense exchange platform 210 and the SOC 250 and the plurality of disparate security data sources 220-238. In these examples, networked connections used by the integrated cyber threat defense exchange platform 210 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 5:
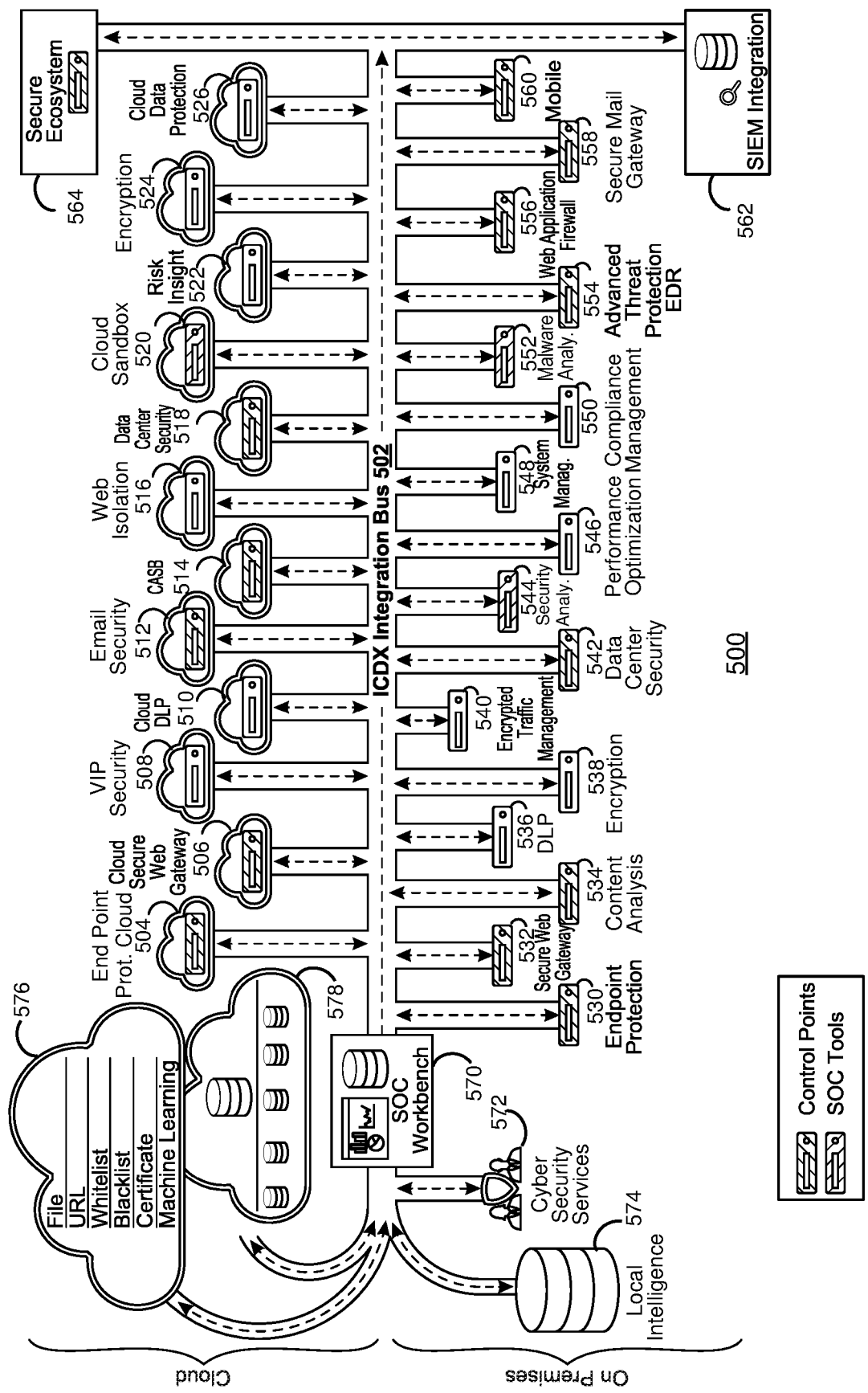
FIG. 5 is a diagram of an example integrated cyber threat defense exchange platform.

In addition to FIG. 2, FIG. 5 provides a more detailed and comprehensive example of the integrated cyber threat defense exchange platform. FIG. 5 is a block diagram of an additional example of an integrated cyber threat defense exchange (ICDX) platform and its communicatively coupled devices 500. As shown in FIG. 5, the integrated cyber threat defense exchange platform, such as the integrated cyber threat defense exchange platform 210 illustrated in FIG. 2, may include an ICDX bus 502 for communicatively coupling the integrated cyber threat defense exchange platform with a variety of cloud-based and on-premises devices (as described herein). As shown in this example, ICDX bus 502 may be communicatively coupled with an end point protection cloud 504 (such as a SYMANTEC End Point Protection Cloud-supporting device), a cloud secure web gateway 506 (such as SYMANTEC Web Security Services-supporting device), a VIP security access device 508 (such as a SYMANTEC VIP Access-supporting device), a cloud data loss prevention (DLP) device 510 (such as a SYMANTEC Cloud DLP-supporting device), an email security device 512 (such as a SYMANTEC Mail Security-supporting device), a cloud access security broker (CASB) device 514 (such as a SYMANTEC CASB-supporting device), a Web Isolation device 516 (such as a SYMANTEC Web Isolation-supporting device), a data center security device 518 (such as a SYMANTEC Data Center Security-supporting device), a cloud sandbox device 520 (such as a SYMANTEC Sandbox-supporting device), a risk insight device 522 (such as a SYMANTEC Risk Insight-supporting device), an encryption device 524 (such as a SYMANTEC Encryption (Cloud)-supporting device), and/or a cloud data protection device 526 (such as a BLUE COAT Cloud Data Protection (CDP)-supporting device), among many other potential devices (including devices offered or maintained by other security vendors).

Further examples of devices connected to ICDX bus 502 include, without limitation, an endpoint protection device 530 (such as a SYMANTEC Endpoint Protection-supporting device), a secure web gateway 532 (such as a SYMANTEC Secure Web Gateway-supporting device), a content analysis device 534 (such as a SYMANTEC Content Analysis-supporting device), a data loss prevention (DLP) device 536 (such as a SYMANTEC DLP-supporting device), an encryption device 538 (such as a SYMANTEC Encryption (On Premises)-supporting device), an encrypted traffic management device 540 (such as a SYMANTEC Encrypted Traffic Management-supporting device), a data center security device 542 (such as a SYMANTEC Data Center Security-supporting device), a security analysis device 544 (such as a SYMANTEC Content Analysis and Malware Analysis-supporting device), a performance optimization device 546 (such as a SYMANTEC Wide Area Network (WAN) Optimization-supporting device), a system management device 548 (such as a SYMANTEC Information Technologies (IT) Management Suite-supporting device), a compliance management device 550 (such as a SYMANTEC Control Compliance Suite-supporting device), a malware analysis device 552 (such as a SYMANTEC Content Analysis and Malware Analysis-supporting device), an advanced threat protection endpoint detection and response device 554 (such as a SYMANTEC advanced threat protection EDR), a web application firewall device 556 (such as a BLUE COAT Web Application Firewall-supporting device), a secure mail gateway 558 (such as a SYMANTEC Messaging Gateway-supporting device), and/or a mobile security device 560 (such as a SYMANTEC Mobile Security-supporting device), among many other potential devices (including devices offered or maintained by other security vendors).

ICDX bus 502 may also communicatively couple the ICDX platform with a Security Information Event Management (SIEM) Integration device 562 (such as enabling SYMANTEC Advanced Threat Protection (ATP) Integration with SIEM/Workflow-supporting device) and a secure ecosystem 564 (such as WEBALO, DAMAKA, ALFRESCO, and/or SAVO GROUP secure ecosystem-supporting devices using SYMANTEC Mobile Partner Ecosystem). Note that for devices illustrated in FIG. 5 with descending crosshatching, such as for the cloud sandbox device 520, the descending crosshatching indicates that in some examples that device is an SOC tool. Similarly, for devices illustrated in FIG. 5 with ascending crosshatching, such as for the data center security device 518, the ascending crosshatching indicates that in some examples that device is a control point.

ICDX bus 502 may also communicatively couple the integrated cyber threat defense exchange platform with a SOC workbench 570 (such as a SIEMPLIFY SOC Workbench-supporting device). SOC workbench 570 may be communicatively coupled to a cyber security service 572 (such as a SYMANTEC Cyber Security Service-supporting device), a logical intelligence device 574 (such as a device that collects information about local security threats), a cloud-based application 576 managing a file, a uniform resource locator (URL), a whitelist, a blacklist, a digital certificate, and/or machine learning heuristics, and/or a file hosting service device 578 (such as a DROPBOX file hosting service-supporting device), among many other potential devices (including devices offered or maintained by other security vendors).

Figure 3:
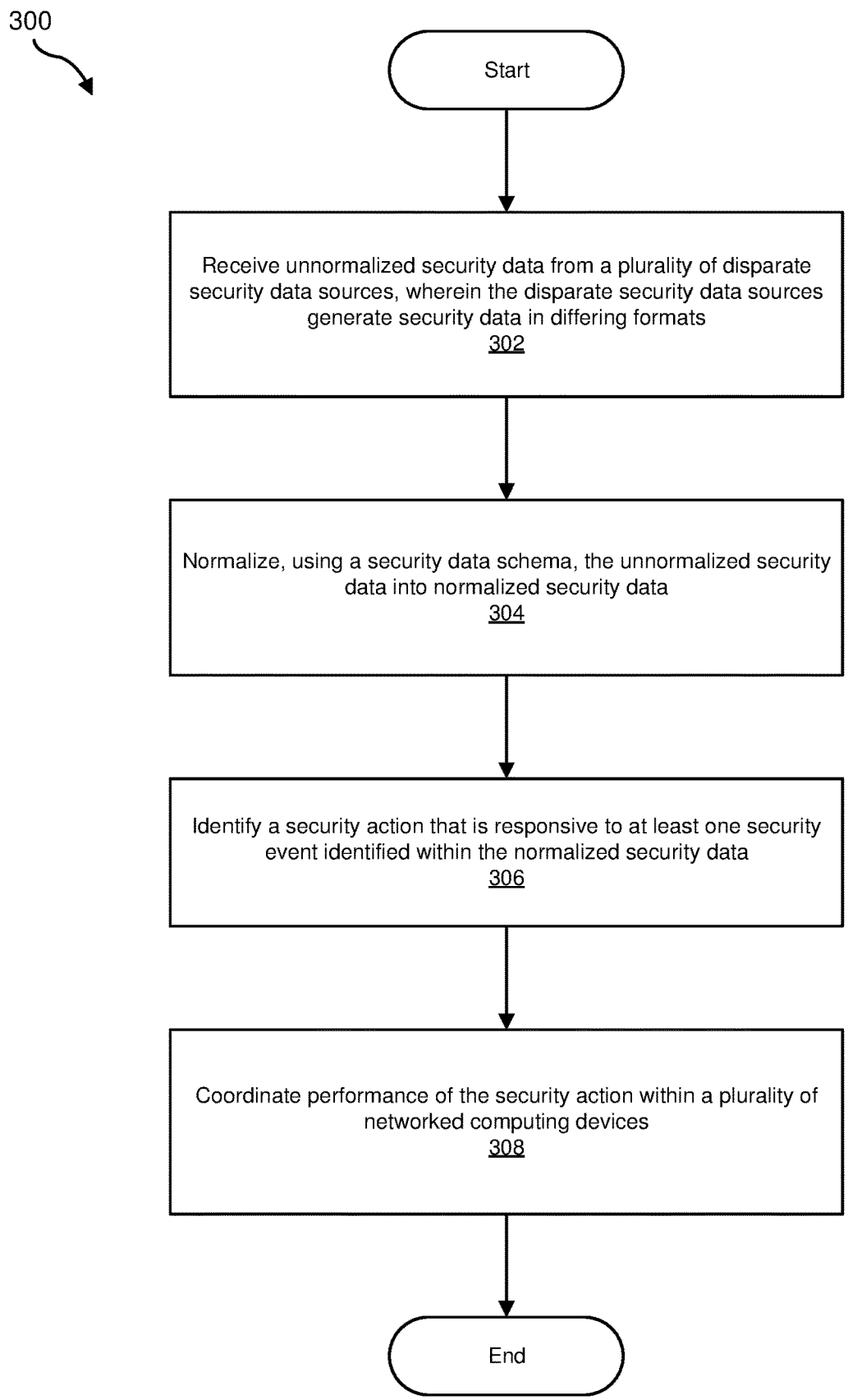
FIG. 3 is a flow diagram of an example method for providing an integrated cyber threat defense exchange platform.

FIG. 3 is a flow diagram of an example computer-implemented method 300 for providing an integrated cyber threat defense exchange platform. The steps shown in FIG. 3 may be performed by any suitable computer-executable code and/or computing system. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive unnormalized security data from a plurality of disparate security data sources. For example, receiving module 104 may, as part of integrated cyber threat defense exchange platform 210 in FIG. 2, receive unnormalized security data 122 from one or more of the disparate security data sources 220-238 illustrated in FIG. 2, each of which may generate security data in a variety of differing formats, fields, and/or structures. As used herein, the term "security data" generally refers to data collected by a security program, security server, and/or security vendor, etc., as part of a security procedure to protect a user and/or corresponding computing resource. Moreover, as used herein, the term "unnormalized security data" generally refers to security data, which has been collected from multiple different security data sources, where the security data sources record values for one or more of the same attributes in different formats or configuration such that data recorded by one of the different security data sources is not readable by, usable by, or compatible with another one of the security data sources, and/or vice versa.

As one illustrative example, one security data source may record the file name "test.txt" using the template or configuration "FLNAME=test.txt," whereas another distinct security data source may record the same file name "test.txt" using the template or configuration "FILENAME='test' AND FILETYPE='txt'." Accordingly, in this example, although both of these two different security data sources are recording essentially the same item of information, they nevertheless record this item of information using two distinct and essentially mutually-incompatible data recording systems, thereby rendering the recorded security data unnormalized, as further discussed above.

In some examples, the security data may include security event data. Security event data may describe any event detected, monitored, recorded, and/or analyzed by a corresponding security program, product, server, and/or vendor. In some examples, the event may correspond to a security attack or cyberattack. In other examples, the event may correspond to a "smoke detector" event that indicates a detected anomaly, which may or may not further indicate a corresponding security attack.

Additionally, or alternatively, the security data may include security action data. Security action data may optionally include any data that describes, instructs, commands, or records a security action performed to protect a user or corresponding computing resource. Illustrative examples of security actions may include (i) heightening or enabling one or more security settings, (ii) disabling, powering down, quarantining, sandboxing, isolating, disconnecting, and/or deleting one or more computing resources, (iii) executing one or more remediation and/or inoculation scripts, especially one or more such scripts that are specifically tailored to address a specific security threat or attack, (iv) alerting or warning a user or administrator, and/or (v) updating, maintaining, and/or synchronizing one or more security, antivirus, anti-malware, firewall, and/or other security software definition sets. Additionally, or alternatively, the security data may include security intelligence data. Security intelligence data may optionally include any data that indicates the basis, and/or that indicates the results of, one or more security analyses performed by a corresponding security program, product, vendor, and/or analyst. Examples of the types of security event data that may be received in step 302 include, without limitation, boot record detection events, compliance events, compliance scans, email detection events, email phishing detection events, file detection events, file response events, kernel detection events, host network detection events, memory detection events, module detection events, network detection events, monitored source events, process detection events, process response events, registry key detection events, registry key response events, registry value detection events, registry value response events, scan events, session detection events, unscannable file events, and/or web phishing detection events, among many others.

In some examples, the security data received by reception module 104 may include a license activity report. The license activity report may describe usage of a software application that is licensed by a corresponding client or customer of a security vendor. Examples of the types of license activity report data that may be received in step 302 include, without limitation, a license count report, license expiry events, and/or a license lifecycle report, among many others.

Additionally, or alternatively, the security data received by reception module 104 may include a software application behavior or activity report. The software application behavior report may describe behavior of a corresponding software application executing on a client or customer computing device. For example, the software application behavior report may describe file access and/or network transmission events trigger by, or associated with, execution of the software application. Examples of the types of software behavior or activity data that may be received in step 302 include, without limitation, application logs, application lifecycle reports, BitLocker reports, certificate expiry events, certificate lifecycle reports, command activity reports, registration events, update events, update available events, and/or user message events, among many others.

Additionally, or alternatively, the security data received by reception module 104 may include a report of user activity at a management console and/or a report of a user-specified configuration change at the management console. For example, reception module 104 may receive a report indicating that a user or administrator altered, or adjusted, a configuration of the client or customer computing device. The corresponding report may specify details about the change in the configuration of the computing device, including describing both the state of the computing device prior to the change and subsequent to the change. More generally, the security data received by reception module 104 may include a device activity report (detailing, e.g., directory activity, file activity, host network activity, kernel activity, memory activity, module activity, network activity, process activity, registry key activity, registry value activity, session activity, etc.), audit reports (detailing, e.g., policy override events, entity audits, session audits, etc.), and/or a result from a diagnostic routine (detailing, e.g., the system's CPU usage, memory usage, and throughput and/or its status or other statistics).

In further examples, the security data received by reception module 104 may also include an evidence of compromise (EoC) event report including an EoC query and/or an EoC event report including a remediation record. The evidence of compromise event report may document evidence indicating that a corresponding client or customer computing device was compromised by a security threat. The evidence of compromise event report may also optionally document one or more details about a remediation procedure that was performed in response to detecting the evidence indicating the compromise of the computing device. Examples of the types of EoC data that may be received in step 302 include, without limitation, unsuccessful remediation result events, directory remediation events, file remediation events, kernel remediation events, module remediation events, network remediation events, process remediation events, registry key remediation events, registry value remediation events, service remediation events, session remediation events, directory query results, file query results, kernel object query results, module query results, network query results, process query results, registry key query results, registry value query results, service query results, and/or session query results, among many other potential items and events.

Reception module 104 may receive the unnormalized security data in a variety of ways. In general, reception module 104 may receive the unnormalized security data at least in part by receiving one portion of the unnormalized security data from one security data source and additionally receiving another portion of the unnormalized security data from a different security data source. In these examples, the security data may be unnormalized in the sense that one of the security data sources records security data according to a format, template, pattern, and/or configuration that is different from that used by the other security data source, as further described above. The differences between the format, template, pattern, and/or configuration used by the two different security data sources to record corresponding security information may render one or more instances of security data recorded by one of the security data sources to be unreadable by, or incompatible with, the other one of the security data sources. In these examples, references have been made to two different security data sources. Nevertheless, in other examples, the number of security data sources transmitting data to reception module 104 may be greater than two, and in some cases be much greater than two. For example, FIG. 2 shows at least 11 different examples of different security data sources.

In general, reception module 104 may receive the unnormalized security data from a networked computing device that recorded the security data as a contributor to the integrated cyber threat defense exchange platform. In these examples, the computing device that recorded the security data may first detect a security event that the security data described. Subsequently, the network computing device may record the security data based at least in part on detection of the security event. For example, the networked computing device may record the security data according to an unnormalized conventional protocol that generates unnormalized security data, as further discussed below in connection with step 304 of method 300. Moreover, in these examples, the networked computing device may also optionally transmit the security data to the integrated cyber threat defense exchange platform.

At step 304, the systems described herein may normalize, using a security data schema, the unnormalized security data received in step 302. For example, normalization module 106 may, as part of integrated cyber threat defense exchange platform 210 illustrated in FIG. 2, normalize, using security data schema 124 in FIG. 1, unnormalized security data 122 into normalized security data.

As used herein, the term "security data schema" generally refers to a centralized data structure that provides a consistent and unified security data recording convention for recording security data that was previously recorded using a variety of different and potentially mutually-inconsistent recording formats, as further discussed above. In other words, the security data schema may generally provide a target data structure onto which values and corresponding fields from different and potentially mutually-inconsistent security data sources may be mapped.

In some examples, the above-described security data schema may normalize security data into a variety of event categories, such as the event categories outlined above (e.g., security events, license events, application activity events, audit events, system activity events, diagnostic events, and/or evidence of compromise events, among others). This data schema may also normalize data associated with a variety of different types of objects, such as certificates, cloud hosted virtual machine (VM) objects, email objects, event source objects, file objects, file content type objects, fingerprint objects, kernel resource objects, license information objects, location objects, managed entity objects, network connection objects, network information objects, policy objects, process objects, registry key objects, registry value objects, rule objects, service objects, threat objects, session objects, uniform resource locator (URL) objects, and/or user objects, among many others.

Returning to the file name example that was previously described above, one security data source may record the file name "test.txt" using the template or configuration "FLNAME=test.txt," whereas another distinct security data source may record the same file name "test.txt" using the template or configuration "FILENAME='test' AND FILETYPE='txt'." In this example, the security data schema may provide a centralized, consistent, normalized, and/or canonical target data structure for recording security data. More specifically, in this example, the security data schema may specify that the file name will be recorded using the attribute name "file_name." Moreover, the security data schema may also optionally specify a particular variable type or data structure for recording the value corresponding to the attribute name. Although this example refers to file names, in additional or alternative examples the security data schema may specify attribute names and/or corresponding variable types or data structure types for a wide variety of incoming and previously recorded security data.

The security data schema may also optionally specify, for each individual attribute, an indication of whether the attribute is required, recommended, or optional. In some examples, this indication may define how the different security data sources, as outlined above, and/or various clients, customers, competitors, or alternative security vendors may use the security data schema. For example, the security data schema may specify whether a client, customer, or alternative security vendor should populate one or more data fields collecting security data based at least in part on the indication of whether the corresponding attribute is required, recommended, or optional.

Furthermore, the security data schema may also optionally specify, for each individual attribute, an indication of whether the corresponding attribute includes, or replicates, personally identifiable information. Additionally, the document, file, or other data structure defining the security data schema may also optionally include, for one or more individual attributes, a text description that further describes and elaborates on these attributes. In some examples, the security data schema may also arrange one or more of the attributes within a hierarchy such that at least one attribute depends upon another attribute in a child-parent or other hierarchical relationship. As one illustrative example, the attribute of a file type may constitute a field within a larger data structure that defines a filename, because the file type and its corresponding three-character identifier may form a subset of the larger filename (e.g., "txt" forms a subset of "test.txt"). More generally, in some examples the security data schema may include a superset of security data attributes from a plurality of different security data points. For example, the security data schema may include a superset that forms the conjunction between a set of security data attributes from one security data point and another differing set of security attributes from another different security data point. In these examples, one of the security data points may capture or record one attribute of security data that another one of the security data points does not necessarily capture. Moreover, in these examples, each attribute from the superset of security data attributes may optionally be listed in an attribute dictionary stored in a data storage device.

Normalization module 106 may normalize the unnormalized security data in a variety of ways. In general, normalization module 106 may normalize the unnormalized security data at least in part by mapping a field of incoming security data to a corresponding field of the security data schema. In other words, normalization module 106 may determine, or detect, that a field of incoming security data corresponds to another field of the security data schema. In general, normalization module 106 may parse the unnormalized security data such that normalization module 106 is able to extract one or more items of underlying information included within the unnormalized security data. Normalization module 106 may extract an underlying value from the field of the incoming security data. Returning to the file name example that was previously outlined above, if the incoming security data recorded a value for a file name using the following convention "FLNAME=test.txt," then normalization module 106 may extract the underlying value for this field (i.e., extract the value "test.txt"). Moreover, after extracting the underlying value from the field of the incoming security data, normalization module 106 may then record the value for this field of security data according to the convention or protocol defined by the security data schema, as further discussed above. For example, normalization module 106 may record the value for the field of incoming security data within a data structure or variable having a name that corresponds to, and was previously mapped to, the field of the incoming security data. Moreover, in these examples, normalization module 106 may record the underlying value for the field of incoming security data within the particular type of data structure or variable that the security data schema specifies for the field. Normalization module 106 may also optionally mark whether the recorded field of security data, as defined according to the conventional protocol of the security data schema, includes or replicates personally identifiable information. Furthermore, after normalizing the unnormalized security data, normalization module 106 may also optionally archive the normalize security data onto one or more storage devices or other instances of computing memory.

In some examples, normalization module 106 may perform step 304 as part of a data flow corresponding to method 300. Returning to the example of FIG. 2, the disparate security data sources 220-238 may optionally connect bidirectionally to integrated cyber threat defense platform 210. When unnormalized security data arrives at integrated cyber threat defense platform 210 from one or more of the disparate security data sources 220-238, normalization module 106 may optionally first parse the incoming unnormalized security data. In some examples, the incoming unnormalized security data may belong to one or more different and mutually-inconsistent data streams. Illustrative examples of these data streams may be coupled to a respective and corresponding network connector, such as data streams corresponding to a KAFKA network connector, an AMPQ or ADVANCED MESSAGE QUEUING PROTOCOL network connector, a database network connector, a TCP or TRANSPORT CONTROL PROTOCOL network connector, and/or a web service network connector. Normalization module 106 may subsequently normalize the unnormalized security data (e.g., parsing the incoming unnormalized security data enables normalization module 106 to understand and thereby normalize the unnormalized security data). In these examples, normalization module 106 may parse the unnormalized security data using a unique or specialized parser that is specifically tailored to the formatting of the corresponding incoming data stream (e.g., using a unique or specialized parser that is specifically tailored to address a data stream from a KAFKA network connector as distinct from a TCP network connector).

After normalizing the unnormalized security data, normalization module 106 may also optionally archive the normalized security data. Again, normalization module 106 may normalize the unnormalized security data using a unique or specialized normalizer that is specifically tailored to address the formatting of the corresponding data stream (e.g., using a unique or specialized normalizer that is specifically tailored to address a data stream from a KAFKA network connector as distinct from a TCP network connector, as further discussed above). After normalizing the unnormalized security data, normalization module 106, and/or coordination module 110, may optionally route one or more items of normalized security data to a network destination corresponding to one or more SOC capabilities of SOC 250. Illustrative examples of these SOC capabilities include data lake storage and/or SECURITY INFORMATION AND EVENT MANAGEMENT (SIEM) storage, security action orchestration (e.g., as discussed further below in more detail regarding step 308 of method 300), and/or security threat intelligence and/or analysis.

For example, in the case of normalized security data that describes one or more underlying security events, normalization module 106 and/or coordination module 110 may optionally route this normalized security data to a data lake and/or a SIEM destination. In the case of normalized security data that describes one or more underlying security actions, coordination module 110 may optionally facilitate communication of this normalized security data from SOC 250, which may be performing one or more security action orchestration functions, to one or more of the disparate security data sources 220-238. In these examples, coordination module 110 may facilitate the communication of this normalized security data using a standard adaptor that is optionally disposed within integrated cyber defense threat exchange platform 210. In some examples, the standard may correspond to a standard that is specifically tailored to address and facilitate cybersecurity command-and-control operations (e.g., a standard or protocol such as OASIS OPEN COMMAND AND CONTROL (OPENC2)). Additionally, or alternatively, normalization module 106 may store one or more items of normalized security data within a data history disposed within integrated cyber defense threat exchange platform 210. In these examples, normalization module 106 may optionally store the items of normalized security data in a manner that enables normalization module 106, and/or another module such as coordination module 110, to collate the normalized security data.

In some examples, normalizing the unnormalized security data by normalization module 106 may enable a user, administrator, and/or SOC 250 to perform a filtering function on the normalized security data. For example, after normalization module 106 normalizes the unnormalized security data, normalization module 106 and/or coordination module 110 may optionally route, forward, translate, and/or archive the normalized security data to multiple different destinations. Nevertheless, underlying privacy, security, and/or retention policies may specify that different items or amounts of normalized security data should be archived at one network destination in comparison to another network destination. For example, normalization module 106 may optionally filter one or more items of normalized security data that is being transmitted to one network destination for archiving (e.g., selectively filter for compliance with privacy regulations such as GDPR or GENERAL DATA PROTECTION REGULATION compliance) even though normalization module 106 does not filter the same one or more items of normalized security data when transmitting the same security data to a different or alternative network destination for archiving. As another example, one or more security, privacy, and/or retention policies may specify that no personally identifiable information may be archived within a public cloud storage service, and accordingly normalization module 106 may optionally filter personally identifiable information when routing the normalized security data to such a public cloud storage service. In these examples, the normalized security data may be filtered differently depending on whether the normalized security data is being archived at a data lake, archived at an off-premise destination storage archive, and/or archived at a public cloud storage service, as further discussed above. Additionally, or alternatively, coordination module 110 may also perform any one or more of the archiving, routing, and/or filtering features that are outlined in the paragraphs above as part of the security action that is performed at step 308 of method 300, as discussed in more detail below. As one illustrative example, coordination module 110 may optionally coordinate the archiving of data that was previously captured at one data source such that the data is archived at a target storage location that corresponds to, or is connected to, another distinct data source. Similarly, coordination module 110 may optionally coordinate the archiving of data that was previously captured at multiple distinct data sources such that one or more copies of the totality of data (and/or varying portions thereof) is intelligently or selectively archived, filtered, and/or routed to one or more target archiving locations, as further described above.

Figure 4:
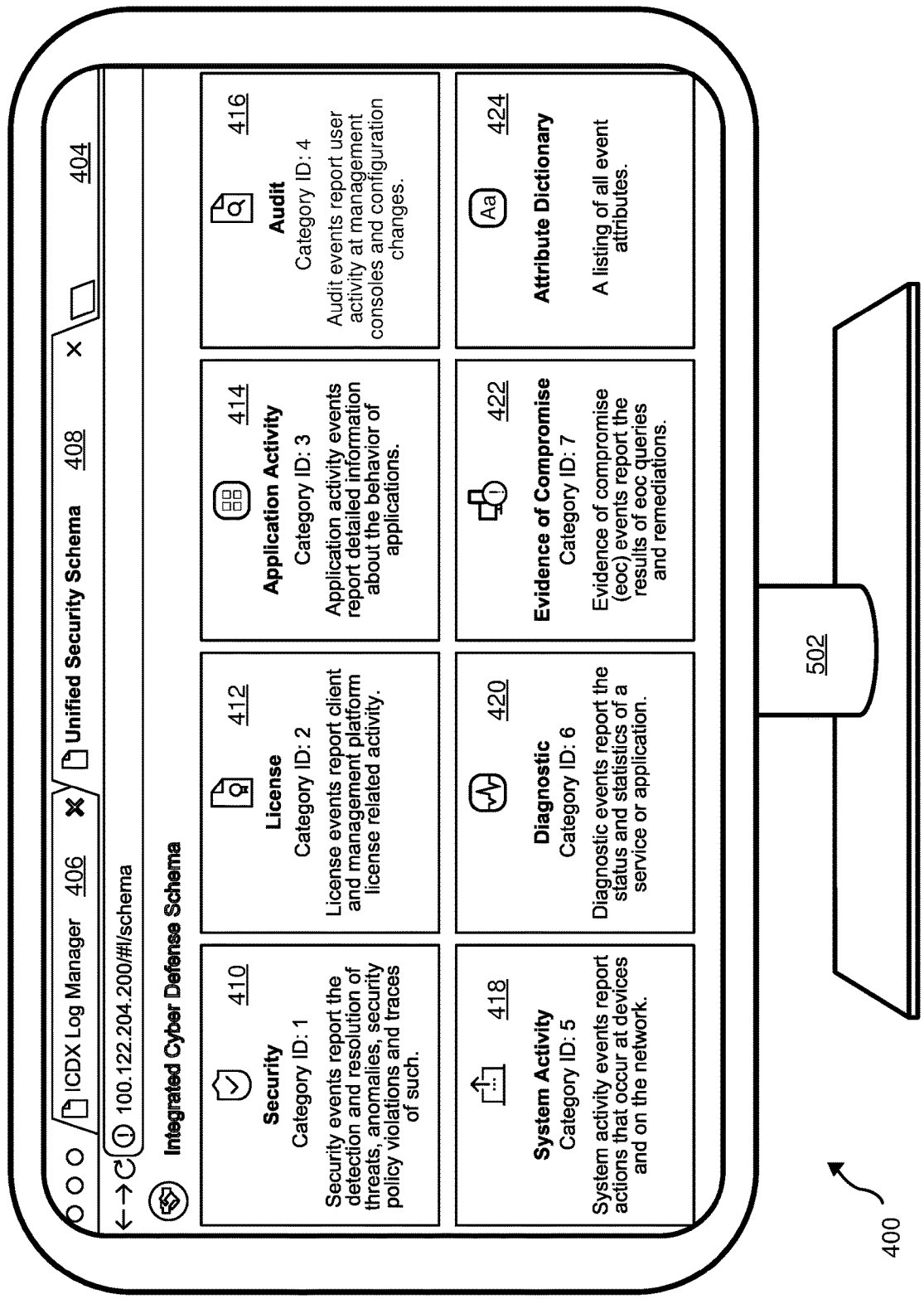
FIG. 4 is a diagram of an exemplary graphical user interface for an integrated cyber threat defense exchange platform.

FIG. 4 is a stylized screenshot view of an example graphical user interface 400 for an integrated cyber threat defense exchange platform. In some examples, the graphical user interface 400 may organize events by category. Additionally, or alternatively, in some examples the actual events may not be indexed by category within graphical user interface 400. In some examples, graphical user interface 400 may not number categories for separate views or tabs. In these examples, numbered categories may optionally be reserved for how event types are organized within the schema. Furthermore, in some examples, viewing events by category may be possible using graphical user interface 400, by leveraging search parameters, where each specific category is just one of multiple parameters that the user may use to limit corresponding events within graphical user interface 400. The example images shown in FIG. 4 may be generated by any suitable computer-executable code and/or computing system, including system 100 in FIG. 1, system 200 in FIG. 2, and/or variations or combinations of one or more of the same.

As illustrated in FIG. 4, a display screen 404 may display an ICDX Log Manager tab 406 and a Unified Security Schema tab 408. In some examples, the Unified Security Schema tab 408 may display normalized security data having different numbered categories. In this example, Unified Security Schema tab 408 may provide a uniform control interface to access information associated with each of a plurality of different numbered categories of normalized security data. In some examples, the Unified Security Schema tab 408 may enable an administrator or other user to access, analyze (via, e.g., a variety of different reports and/or dashboards), and/or respond to or otherwise manage the normalized security data within each category.

Within the second tab 408, a first image represents security event data 410 having Category ID 1. For example, security event data 410 having Category ID 1 contains a security events report describing detection and resolution of threats, anomalies, security policy violations, and traces of such occurrences.

Within the second tab 408, a second image represents security event data 412 having Category ID 2. For example, security event data 412 having Category ID 2 contains a license events report describing client and management platform license related activity.

Within the second tab 408, a third image represents security event data 414 having Category ID 3. For example, security event data 414 having Category ID 3 contains an application activity events report describing detailed information about the behavior of applications.

Within the second tab 408, a fourth image represents security event data 416 having Category ID 4. For example, security event data 416 having Category ID 4 contains an audit events report describing user activity at management consoles and configuration changes.

Within the second tab 408, a fifth image represents security event data 418 having Category ID 5. For example, security event data 418 having Category ID 5 contains system activity events report describing actions that occur at devices and on a network.

Within the second tab 408, a sixth image represents security event data 420 having Category ID 6. For example, security event data 420 having Category ID 6 contains a diagnostic events report describing the status and statistics of a service or application.

Within the second tab 408, a seventh image represents security event data 422 having Category ID 7. For example, security event data 422 having Category ID 7 contains an Evidence of Compromise (EoC) report describing results of EoC queries and remediations.

Within the second tab 408, an eighth image represents security event data 424 including an attribute dictionary. For example, the attribute dictionary contains a listing of security data event attributes. In some embodiments, the attribute dictionary provides a listing of attributes or fields used to generate the security data schema.

As detailed above, the graphical interface illustrated in FIG. 4 may enable administrators and other users to quickly and easily access and evaluate information associated with a variety of categories of normalized security data. By doing so, this interface may provide a single unified view of the various security events (and potential remedial actions that can be performed in response to the same) generated by the variety of disparate security data sources managed by the integrated cyber threat defense exchange platform described herein.

Returning to method 300 of FIG. 3, at step 306, the systems described herein may identify a security action that is responsive to at least one security event identified within the normalized security data. For example, identification module 108 may, as part of integrated cyber threat defense exchange platform 210 illustrated in FIG. 2, identify a security action that is responsive to at least one security event identified within the normalized security data.

As used herein, the term "security action" may refer to any action performed as part of a security procedure to protect a user or corresponding computing resource. As further outlined above, illustrative examples of security actions may include (i) heightening or enabling one or more security settings, (ii) disabling, powering down, quarantining, sandboxing, isolating, disconnecting, and/or deleting one or more computing resources, (iii) executing one or more remediation and/or inoculation scripts, such as one or more such scripts that are specifically tailored to address a specific security threat or attack, (iv) alerting or warning a user or administrator, and/or (v) updating, maintaining, and/or synchronizing one or more security, antivirus, antimalware, firewall, and/or other security software definition sets. Additionally, or alternatively, the security data may include security intelligence data.

Identification module 108 may identify the security action in a variety of ways. In general, identification module 108 may identify the security action by matching the security action to a corresponding security threat signature detection and/or security incident detection at a client computing device. For example, identification module 108 may reference a security action schema, or mapping, that maps security threat signature detections and/or security incident detections the corresponding security actions. As further outlined above, one or more of the security actions identified at step 306 may be specifically tailored, customized, personalized, and/or targeted to address the specific security threat signature detection and/or security incident detection indicated by the underlying security data. In some examples, an administrator or other user may view, access, or otherwise initiate identified security actions via the user interface illustrated in FIG. 4. In other examples, the integrated cyber threat defense exchange platform described herein may automatically initiate security actions without administrator or user input.

At step 308, the systems described herein may coordinate performance of the security action identified in step 306. For example, coordination module 110 may, as part of integrated cyber threat defense exchange platform 210 illustrated in FIG. 2, coordinate the performance of the security action identified in step 306 among the disparate security data sources 220-238 illustrated in FIG. 2.

Coordination module 110 may coordinate the performance of the security action in a variety of ways. In general, coordination module 110 may coordinate the performance of the security action at least in part by managing a partial performance of the security action by one of the security data sources (or other networked computing devices) and also managing a partial performance of a remainder of the security action by another one of the security data sources. For example, coordination module 110 may direct one of the security data sources to perform one portion of the security action and may also direct another one of the security data sources to perform another portion of the security action.

In some examples, coordination module 110 may facilitate the performance of the security action at least in part by disseminating some or all of the normalized security data that was normalized at step 304, as further discussed above in connection with method 300 of FIG. 3. For example, coordination module 110 may optionally publish some or all of the normalized security data at one or more network addresses where the normalize security data may be retrieved, accessed, read, and/or input by one or more of the security data destinations. Additionally, or alternatively, coordination module 110 may transmit a copy of some or all of the normalize security data to one or more of the security data destinations. In some examples, coordination module 110 may disseminate some or all of the normalize security data by disseminating the normalized security data to all of the security data destinations contributing to the integrated cyber threat defense exchange platform (e.g., sources 220-238 shown in FIG. 2). In some examples, an administrator or other user may view, access, or otherwise coordinate the performance of security actions via the user interface illustrated in FIG. 4. In other examples, the integrated cyber threat defense exchange platform described herein may automatically initiate and coordinate the performance of security actions without administrator or user input.

Additionally, or alternatively, coordination module 110 may coordinate the performance of the security action at least in part by specifically tailoring the security action to match details regarding an underlying detected potential security risk, where the totality of details regarding the underlying detected potential security risk are based on multiple instances of data from distinct data sources. For example, coordination module 110 may identify that a security product at one data source has identified one item of information, such as a network address (e.g., an INTERNET PROTOCOL address). Additionally, in this example coordination module 110 may also match this identified item of information to another distinct item of information, such as a user account, that was detected at a security product at a distinct data source. In this example, coordination module 110 may make an intelligent inference that one item of information detected at one security product for one data source implies, or maps to, another distinct item of information detected at a distinct security product for another distinct data source. Coordination module 110 may perform this inference task and/or mapping between items of information using any suitable software intelligence, business logic, and/or security-based algorithm or heuristic. Coordination module 110 may also perform this inference task and/or mapping between items of information based on one or more items of surrounding contextual information, such as items of information obtained from one or more additional or remaining data sources.

Subsequently, coordination module 110 may specifically tailor the security action to address the specifics of both the item of information detected at one of the data sources and also the distinct item of information detected at the additional distinct data source. In the illustrative example outlined above, coordination module 110 may coordinate the performance of a security action such that the security action is specifically tailored to address the specifics of both the INTERNET PROTOCOL address identified or detected at one security product for one data source and also address the specifics of the user account identifier detected at another security product for another distinct source. In this manner, coordination module 110 may increase the intelligence or sophistication of security actions performed through the integrated cyber threat defense exchange platform by basing the security actions on totalities of information that represent aggregates of multiple distinct items of information identified or detected at multiple distinct data sources.

In summary, and as further described above, by receiving and normalizing previously unnormalized security data from a plurality of disparate security data sources using a security data schema, the integrated cyber threat defense exchange platform disclosed herein may be able to coordinate the performance of security action(s) within a multitude of networked computing devices. This may, in turn, enable the integrated cyber threat defense exchange platform to leverage knowledge of a threat, solution, and related intelligence from one security data source to improve the security of other disparate security data sources, even if those security data sources are offered or maintained by disparate security vendors that generate and/or maintain security data in differing formats. The disclosed subject matter may also enable different and varying security programs, devices, databases, vendors, and/or analysts to inter-communicate and thereby share underlying security data using a simplified and centralized communications bus (e.g., the integrated cyber threat defense exchange platform) rather than communicating using an exponentially growing number of direct point-to-point communication links.

Figure 6:
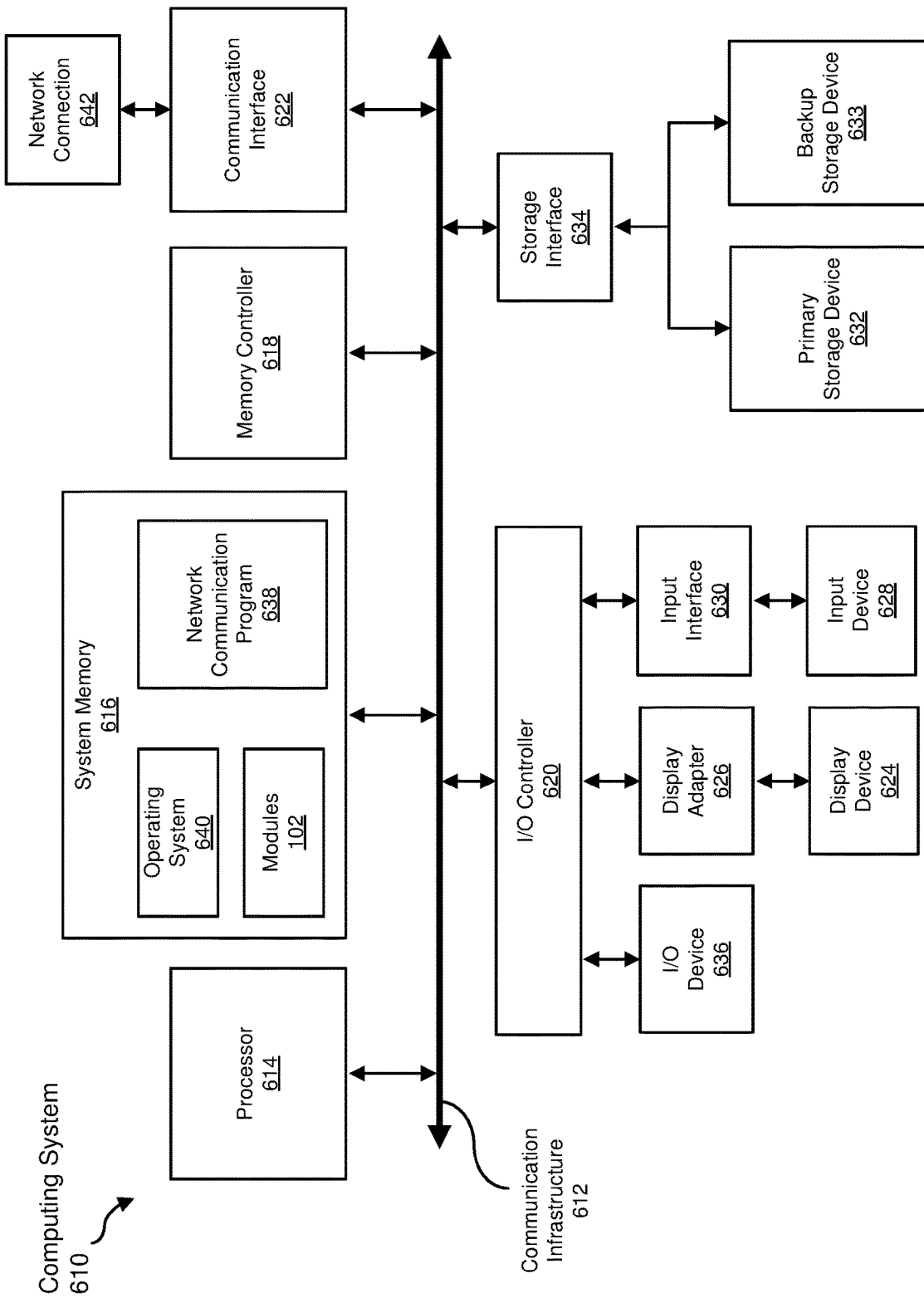
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, unnormalized security data 122, security data schema 124, and the normalized security data from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
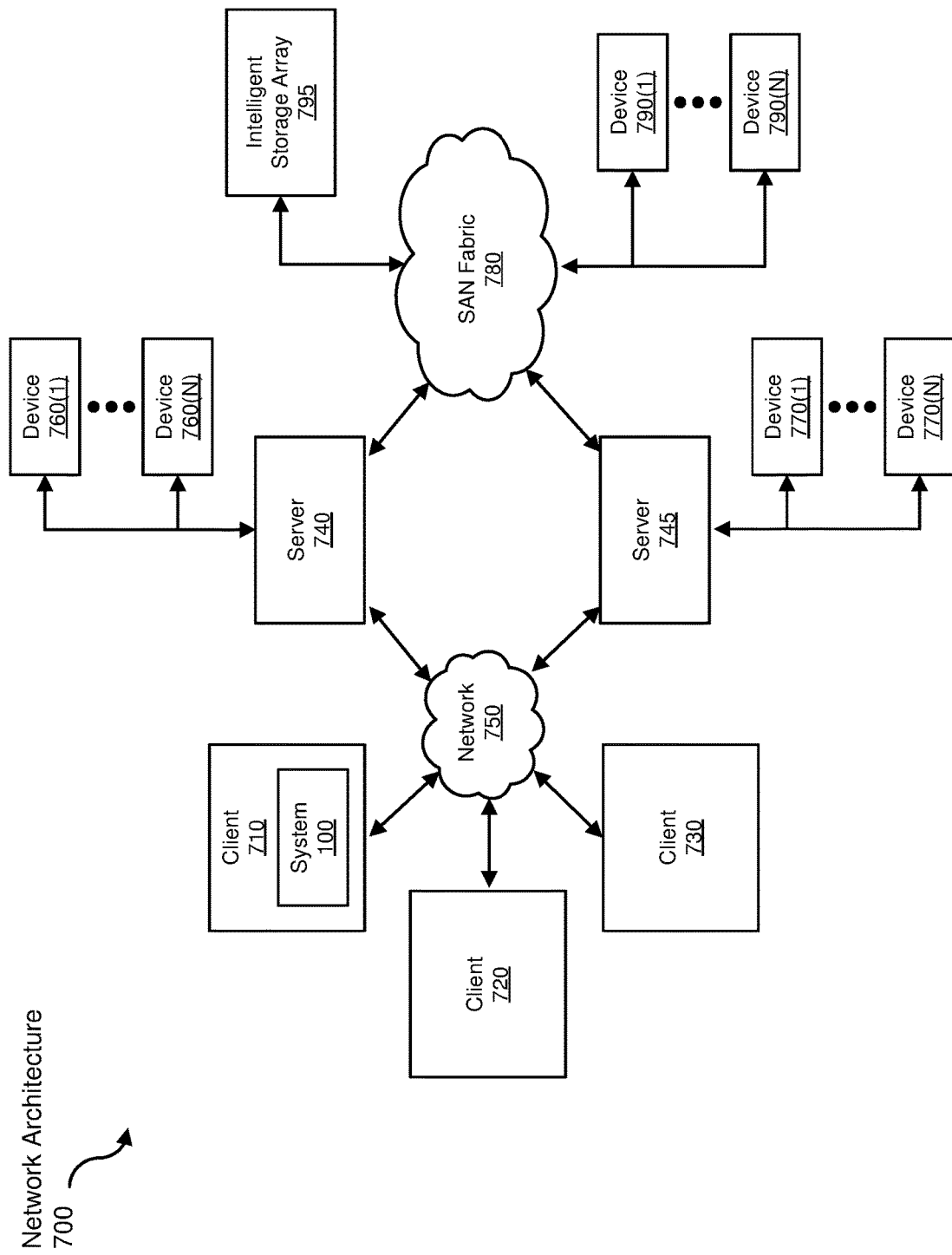
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for providing an integrated cyber threat defense exchange platform.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
    receiving, at an integrated cyber threat defense exchange platform, unnormalized security data from a plurality of disparate security data sources, wherein the disparate security data sources generate the unnormalized security data in differing formats;
    normalizing, by the integrated cyber threat defense exchange platform using a security data schema, the unnormalized security data into normalized security data;
    identifying, by the integrated cyber threat defense exchange platform, a security action that is responsive to at least one security event identified within the normalized security data; and
    coordinating, by the integrated cyber threat defense exchange platform, performance of the security action within a plurality of networked computing devices;
    wherein:
    the plurality of disparate security data sources comprises at least three of a web security service (WSS) device, a cloud access security broker (CASB) device, an endpoint detection and response (EDR) device, a security analytics device, a malware analysis (MA) device, a data loss prevention (DLP) device, a data center security (DCS) device, and an endpoint protection (EP) device;
    an integrated cyber threat defense exchange bus communicatively couples the integrated cyber threat defense exchange platform with a security information event management integration device and a secure ecosystem; and
    the security data schema provides a target data structure onto which values and corresponding fields from different mutually-inconsistent security data sources are mapped.

2. The computer-implemented method of claim 1, further comprising enabling the integrated cyber threat defense exchange platform to leverage knowledge of a threat from a first security data source to improve the security of a second security data source.

3. The computer-implemented method of claim 2, wherein the first security data source and the second security data source are provided by different vendors.

4. The computer-implemented method of claim 1, further comprising filtering the normalized security data onto a data storage device.

5. The computer-implemented method of claim 1, wherein the integrated cyber threat defense exchange platform is in communication with a Security Operations Center (SOC).

6. The computer-implemented method of claim 5, wherein the Security Operations Center exchanges security event data, security action data, and security intelligence data with the plurality of disparate security data sources through the integrated cyber threat defense exchange platform.

7. The computer-implemented method of claim 6, wherein an administrator is enabled to interface with the Security Operations Center using a Security Operations Center front-end.

8. The computer-implemented method of claim 1, wherein the integrated cyber threat defense exchange bus communicatively couples the integrated cyber threat defense exchange platform with a Security Operations Center workbench.

9. The computer-implemented method of claim 1, wherein the unnormalized security data comprises data from the plurality of disparate security data sources that records values for one or more of the same attributes in different formats such that data recorded by one of the plurality of disparate security data sources is not readable by another one of the plurality of disparate security data sources.

10. The computer-implemented method of claim 1, wherein the security data schema provides a consistent and unified security data recording convention for recording security data that was previously recorded using different and mutually-inconsistent recording formats.

11. A system comprising:
at least one physical processor;
a physical memory comprising computer-executable instructions that, when executed by the physical processor, cause the physical processor to:
receive, at an integrated cyber threat defense exchange platform, unnormalized security data from a plurality of disparate security data sources, wherein the disparate security data sources generate the unnormalized security data in differing formats;
normalize, by the integrated cyber threat defense exchange platform using a security data schema, the unnormalized security data into normalized security data;
identify, by the integrated cyber threat defense exchange platform, a security action that is responsive to at least one security event identified within the normalized security data; and
coordinate, by the integrated cyber threat defense exchange platform, performance of the security action within a plurality of networked computing devices;
wherein:
the plurality of disparate security data sources comprises at least three of a web security service (WSS) device, a cloud access security broker (CASB) device, an endpoint detection and response (EDR) device, a security analytics device, a malware analysis (MA) device, a data loss prevention (DLP) device, a data center security (DCS) device, and an endpoint protection (EP) device;
an integrated cyber threat defense exchange bus communicatively couples the integrated cyber threat defense exchange platform with a security information event management integration device and a secure ecosystem; and
the security data schema provides a target data structure onto which values and corresponding fields from different mutually-inconsistent security data sources are mapped.

12. The system of claim 11, wherein the unnormalized security data comprises at least one of security event data, security action data, and security intelligence data.

13. The system of claim 11, wherein the computer-executable instructions further cause the physical processor to:
parse, the unnormalized security data received from the plurality of disparate security data sources;
filter, the normalized security data onto a first data storage device; and
archive, the normalized security data onto a second data storage device.

14. The system of claim 11, wherein receiving the unnormalized security data comprises receiving the unnormalized security data from at least one networked computing device that:
detects the security event;
records the unnormalized security data based at least in part on detection of the security event; and
transmits the unnormalized security data to the integrated cyber threat defense exchange platform.

15. The system of claim 14, wherein the security event is triggered at least in part by a cyberattack.

16. The system of claim 11, wherein the unnormalized security data comprises at least one of a license activity report, a software application behavior report, a report of user activity at a management console, a report of a user-specified configuration change at the management console, a device activity report, a network activity report, a result from a diagnostic routine, an evidence of compromise (EoC) event report including an EoC query, and an EoC event report including a remediation record.

17. The system of claim 11, wherein the unnormalized security data schema comprises a superset of security data attributes from a plurality of different security data points.

18. The system of claim 17, wherein each attribute from the superset of security data attributes is listed in an attribute dictionary stored in a data storage device.

19. A non-transitory computer-readable medium comprising one or more computer-executable instructions that, when executed by at least one processor of a computing device, cause the computing device to:
receive, at an integrated cyber threat defense exchange platform, unnormalized security data from a plurality of disparate security data sources, wherein the disparate security data sources generate the unnormalized security data in differing formats;
normalize, by the integrated cyber threat defense exchange platform, using a security data schema, the unnormalized security data into normalized security data;
identify, by the integrated cyber threat defense exchange platform, a security action that is responsive to at least one security event identified within the normalized security data; and
coordinate, by the integrated cyber threat defense exchange platform, performance of the security action within a plurality of networked computing devices;
wherein:
the plurality of disparate security data sources comprises at least three of a web security service (WSS) device, a cloud access security broker (CASB) device, an endpoint detection and response (EDR) device, a security analytics device, a malware analysis (MA) device, a data loss prevention (DLP) device, a data center security (DCS) device, and an endpoint protection (EP) device;
an integrated cyber threat defense exchange bus communicatively couples the integrated cyber threat defense exchange platform with a security information event management integration device and a secure ecosystem; and the security data schema provides a target data structure onto which values and corresponding fields from different mutually-inconsistent security data sources are mapped.

20. The non-transitory computer-readable medium of claim 19, wherein the computer-executable instructions further cause the computing device to:
parse the unnormalized security data received from the plurality of disparate security data sources;
filter the normalized security data onto a first data storage device; and
archive the normalized security data onto a second data storage device.

* * * * *